United States Patent
Harris et al.

(10) Patent No.: US 6,442,406 B1
(45) Date of Patent: *Aug. 27, 2002

(54) AIRTIME USAGE LIMITING SYSTEM

(75) Inventors: Michael J. Harris, Oceanside; Donald R. Green, Jr., San Marcos, both of CA (US)

(73) Assignee: Denso Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,695

(22) Filed: Oct. 15, 1999

(51) Int. Cl.[7] ............................................. H04M 15/00
(52) U.S. Cl. ...................... 455/565; 455/407; 455/411; 379/200
(58) Field of Search .................. 455/565, 550, 455/564, 405, 407, 409, 411; 379/200

(56) References Cited

U.S. PATENT DOCUMENTS

| | | | | |
|---|---|---|---|---|
| 4,908,848 A | * | 3/1990 | Hanawa | 379/63 |
| 4,924,499 A | * | 5/1990 | Serby | 379/200 |
| 5,062,134 A | * | 10/1991 | Laird | 379/131 |
| 5,438,612 A | * | 8/1995 | Norimatsu | 379/58 |
| 5,862,470 A | * | 1/1999 | Damghani | 455/418 |
| 5,995,823 A | * | 11/1999 | Stephens | 455/410 |

* cited by examiner

*Primary Examiner*—Lee Nguyen
(74) *Attorney, Agent, or Firm*—Fish & Richardson P.C.

(57) ABSTRACT

A call time usage system for a portable telephone allows entering call time usage information into the portable telephone. The limits include limits on total airtime and airtime per call for a specified interval. After the specified interval, the limits are reset. A list of exempt numbers is also stored so that the user can call those exempt numbers even after the limit is exceeded.

7 Claims, 2 Drawing Sheets

AIRTIME USAGE LIMITING SYSTEM

The present invention relates to an internal limiting system on a cellular telephone.

BACKGROUND

Charges for cellular telephones are often conducted on an airtime basis where the user is charged based on how much airtime is used. User's can often subscribe to a plan in which they get a certain amount of included airtime, after which the charge for the airtime can increase.

In addition, sometimes a user can lend their cellular telephone to another person. One concern is that the other person abuses this by using more call airtime than is intended.

Systems are known, such as prepaid systems, in which the user pays for a certain amount of time. After that time expires, the user can make no further use of the telephone. However, once this time is used up, no one can use the phone. In the case of lending the telephone to one's children, the children could use all of the available time to call their friends, and then would have no time left. The children could not use the phone to call home or receive calls from home.

SUMMARY

The present application, in recognition of the above, defines a cellular telephone with a user interface that allows setting limits on calls. According to the present system, a predetermined limit is placed on at least one of maximum time a call can last, and/or maximum use of the telephone. The limit is placed for an interval and automatically expires at the end of the interval. However, certain telephone calls to specified numbers are allowed even after those limits have expired.

At the end of the interval, the limits are terminated and calls can again be made using the phone. This prevents the user from needing to reset the telephone after, for example, lending it to someone.

This allows the user to set limits on the telephone usage. Those limits persist only for the interval. After the interval, the limits are reset.

BRIEF DESCRIPTION OF THE DRAWINGS

These and other aspects will be described in detail with respect to the accompanying drawings, wherein.

DETAILED DESCRIPTION

Figure 1:
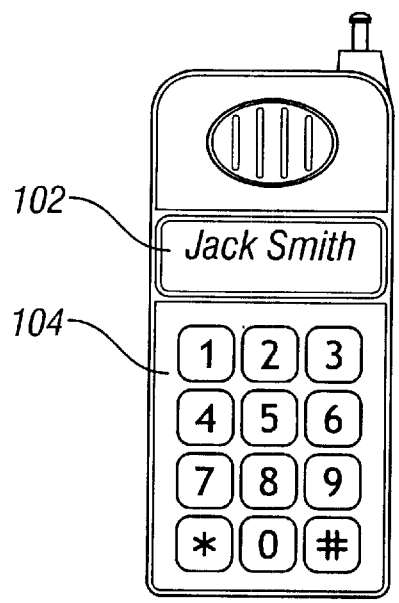
FIG. 1 shows a telephone.

An exemplary telephone shown in FIG. 1 includes a housing 100 with a display 102, user interface keys 104, microphone and speaker, and antenna. The housing holds all of the electronics necessary to operate the telephone, including the cellular electronics.

Figure 3:
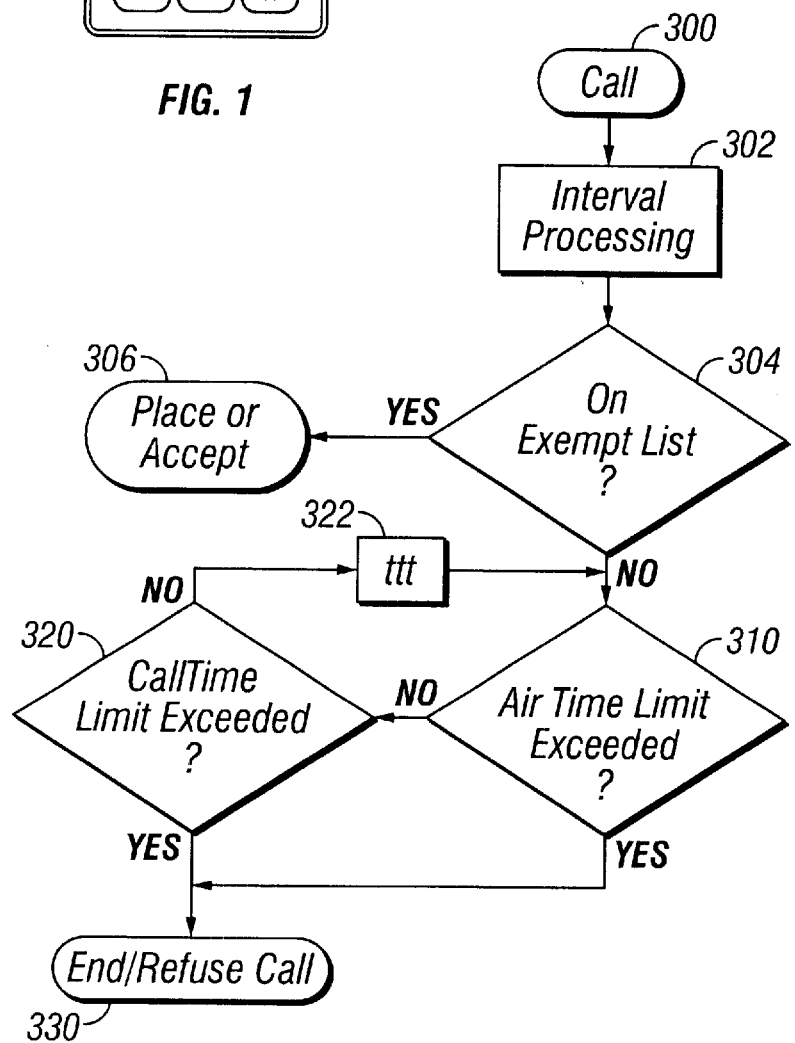
FIGS. 2 and 3 show flowcharts of operation.
Figure 2:
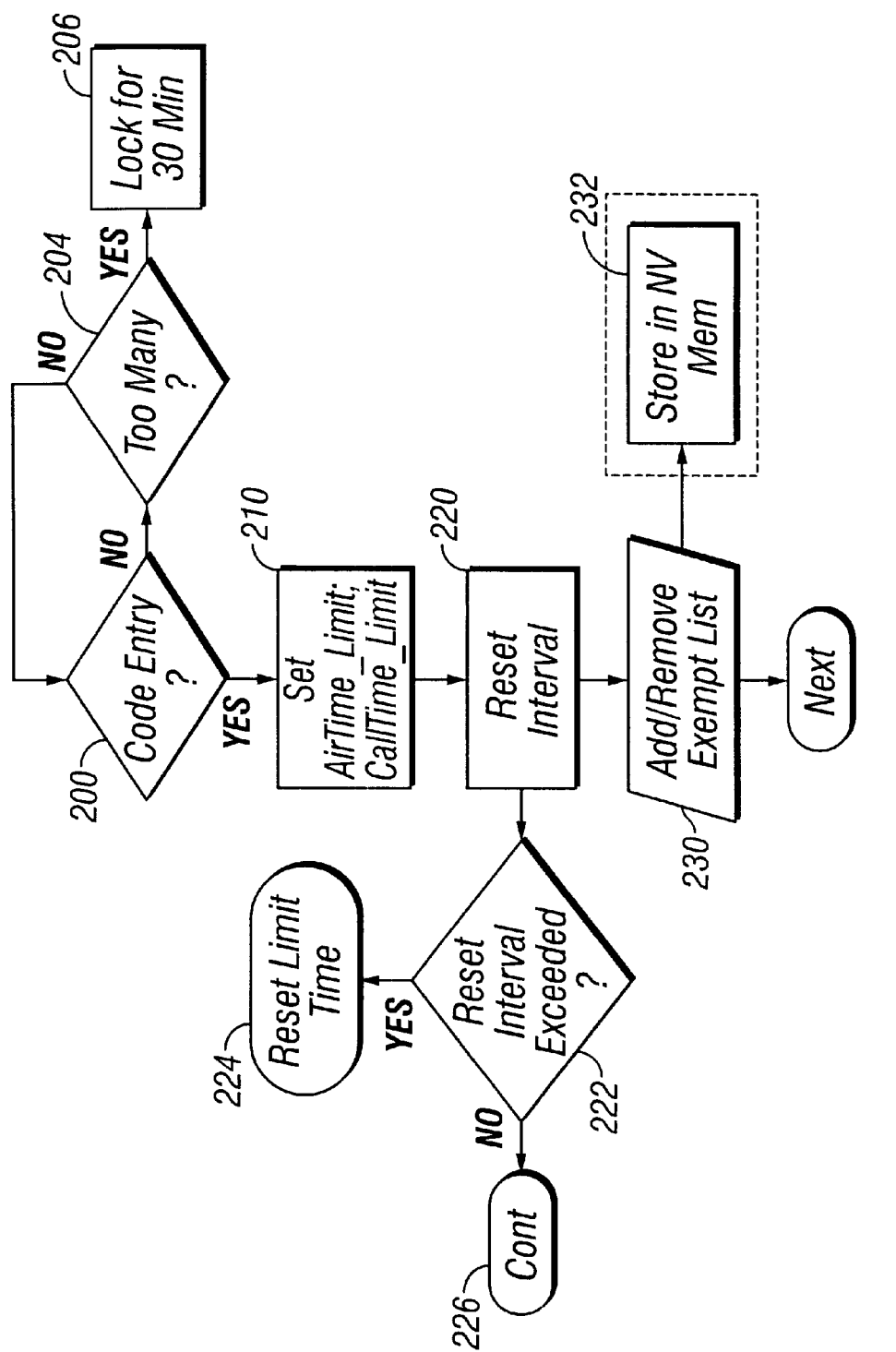

The telephone operates according to an internal processor that operates according to the flowcharts of FIGS. 2 and 3.

New operating parameters that restrict calls are set according to the present system. Access to the operating parameters is shown in FIG. 2. Changing the operating parameter requires entry of a secret code. Presumably this code is known only to the owner of the telephone. The code entry is shown in step 200. When a code entry is correctly entered, flow passes to the parameter-setting-part of the routine, shown as 202. When the code entry is not correct, at step 200, a conventional lockout routine is executed at steps 204, 206. For example, between 3 and 5 incorrect tries for a code entry may be allowed. When the number of allowable wrong code entries exceeds that number at step 204, the telephone is locked for a predetermined period at step 206, e.g. for 30 minutes.

At step 210, the limits on phone usage are set. Two different kinds of limits can be set. The first variable called airtime limit indicates the total number of airtime minutes that can be used during the interval (set at step 220 described herein). The call time limit can also be set, shown at step 210, which limits the total call length for any call. Therefore, a parent or other phone owner could set a 60 minute total airtime, with each call not to exceed ten minutes. Step 220 indicates obtaining the reset interval variable. The reset interval allows setting a time, after which the airtime limit and call time limit variables are reset.

Step 222 shows determining if the interval is exceeded.

This can be done via an interrupt, for example, that is executed every ten minutes. If the reset interval has elapsed, then the airtime limit and call time limit are reset at step 224. Otherwise, the process continues. Again while this is shown as part of the entry scheme in FIG. 2, it could alternately be executed via an interrupt, or as part of the user interface routine of FIG. 3.

Step 230 indicates running a routine to add a specified phone number to the exempt list. Once a number is entered and placed on the exempt list, it is stored in nonvolatile memory 232. In one embodiment, this stored number can be part of the phone book associated with the memory of the telephone. A status portion is associated with the information in memory, which indicates whether the specific number is exempt.

Step 230 also allows removing a number from the exempt list. The nonvolatile memory is at that point to reflect the removal.

FIG. 3 represents the routine executed whenever a call is received or placed. The event, indicated as 300, indicates that a call is to be received or placed. The reset-interval-exceeded routine shown as 222, 224, 226 could be executed at this point. This is represented generally as the interval processing routine 302.

Step 304 determines whether the call to be placed or received is on the exempt list. If the call is on the exempt list, then the call is automatically placed at step 306. If not, step 310 determines if the airtime limit variable is exceeded. If so, the outgoing call is ended at step 330. If the airtime limit is not exceeded at step 310, step 320 tests to determine if the call time limit is exceeded. The call time counter indicates the time that has elapsed since the beginning of the call. If the call time limit is not exceeded, the variable T is incremented at step 322 to indicate that additional time has passed. This routine could be executed, for example every second. The variable T would then be a count of the number of seconds that have elapsed. If the time limit is exceeded, the ongoing call is ended at step 330. If not, flow returns, and one second later the values are tested once again. This embodiment describes counting all call times. However, calls on the exempt list can optionally be not counted.

This system has significant advantages. It enables a user to dynamically set the values of call limits, whenever the user wants to set these limits. When the limits are reached, the telephone is disabled from receiving or placing calls. However, this does not prevent use of the telephone for purposes that the owner of the telephone would want, e.g. emergency (911) and police, or talking with parents. These numbers can be added to the exempt list to enable the telephone to be used even after the time limit has passed. This system can also be used to restrict all access to all numbers other than the desired numbers. For example by setting an interval of 24 hours and setting both airtime limits and call time limits to zero, the telephone could only be used to dial the exempt numbers. This would also have applications, for example, to a delivery person who is given the cellular telephone and allowed only to call the office with it.

The use of the reset interval enables the values to automatically regress after a period. In this way, the user need not reset the telephone unless the limit is reached.

Other modifications within the disclosed embodiment.

What is claimed is:

1. A portable telephone comprising:

a user interface;

a processor, operating a program that controls operation of the portable telephone;

cellular electronics, enabling placing and receiving telephone calls based on operations on said user interface; and a memory storing a program for operation by said processor and also storing an airtime limit value which limits an amount of operation of said portable telephone, wherein said memory also stores a parameter which includes an identifier of a plurality of telephone numbers that are exempt from said airtime limit value, and wherein said memory also stores a value indicative of a reset interval, after which said airtime limit value is automatically reset, said phone being allowed to originate or receive calls as long as said airtime limit value is not exceeded, but not after said airtime limit value is exceeded, and only until said reset internal has elapsed, unless the phone number of said originated call, or the phone number of said received call, is identified by said parameter which includes an identifier of a plurality of telephone numbers that are exempt from said airtime usage limit.

2. The portable telephone of claim 1 wherein said memory also stores a secret code that must be entered through the user interface prior to the storing, within said memory, at least one of said airtime limit value, said reset interval, or said parameter which includes an identifier of a plurality of telephone numbers that are exempt from said airtime limit value.

3. A method of restricting usage in a cellular telephone, comprising:

allowing setting an airtime limit of said cellular telephone, in a memory of the cellular telephone, to a value;

allowing setting a reset interval, in a memory of the cellular telephone, to a value;

allowing setting another parameter which includes an identifier of a plurality of telephone numbers that are exempt from said airtime limit;

causing decrementing of the airtime limit according to a time said cellular telephone is actively engaged in a phone call;

causing decrementing of said reset interval according to time elapsed since the last reset of said reset interval;

causing resetting of said airtime limit and reset interval to their respective values prior to decrementing, if the reset interval has been decremented to zero or less; and causing said cellular telephone to not allow origination or reception of phone calls if the airtime usage limit has been decremented to zero or less, and the phone number for the originated or received phone call is not identified by said parameter which includes an identifier of a plurality of telephone numbers that exempt from said airtime usage limit.

4. A method as in claim 3 wherein said airtime limit includes a total airtime limit.

5. A method as in claim 3 wherein said airtime limit includes a limit of airtime time per call and a total airtime limit.

6. A method as in claim 3 further comprising:

entering a code into the telephone;

determining, in said telephone, if said code is an authorized code; and enabling changing said airtime limit only if said code is an authorized code.

7. The method of claim 3 wherein the prior entry of a secret code through the user interface is required to set at least one of said airtime limit, said reset interval, or said parameter which includes an identifier of a plurality of telephone numbers that are exempt from said airtime limit.

* * * * *